No. 641,806. Patented Jan. 23, 1900.
A. STONE.
CLOSURE OR STOPPER FOR VESSELS.
(Application filed Oct. 25, 1899.)
(No Model.)
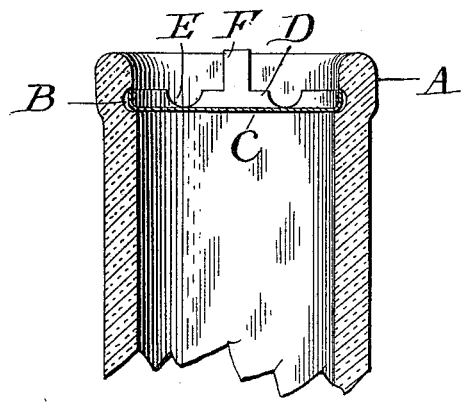
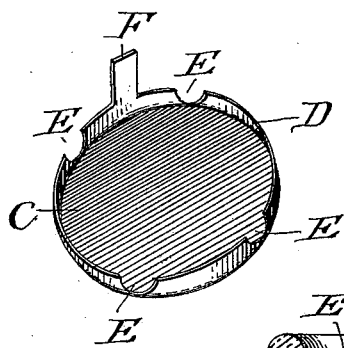
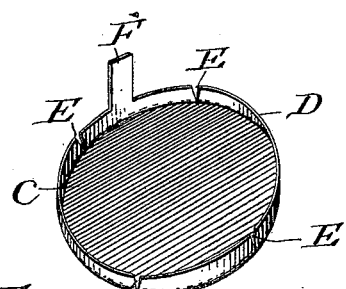
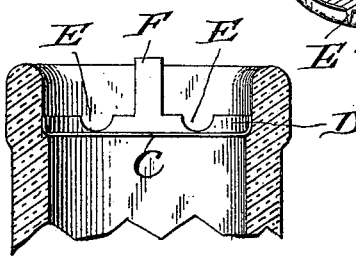
Witnesses
Albert B. Blackwood
Jos H Blackwood
Inventor
Allen Stone

UNITED STATES PATENT OFFICE.

ALLEN STONE, OF WASHINGTON, DISTRICT OF COLUMBIA.

CLOSURE OR STOPPER FOR VESSELS.

SPECIFICATION forming part of Letters Patent No. 641,806, dated January 23, 1900.

Application filed October 25, 1899. Serial No. 734,767. (No model.)

*To all whom it may concern:*

Be it known that I, ALLEN STONE, a citizen of the United States, residing at Washington, in the District of Columbia, have invented certain new and useful Improvements in Closures or Stoppers for Vessels, of which the following is a specification.

My invention relates to closures or stoppers for bottles, jars, and other vessels, more especially a stopper for milk and cream bottles, and has for its object to provide a stopper simple and inexpensive in construction which is adapted to be firmly retained in the neck of the bottle against accidental displacement and can be easily removed when desired to allow a portion of the contents thereof to be discharged and then be replaced, so as to preserve the remainder of the contents, and also to serve as a cup to catch and retain any dirt or other foreign matter and prevent it from falling into the milk when the stopper is being removed.

My invention consists of a cup-shaped stopper for vessels, having a spring-acting rim and a tab; and it further consists in the construction, combination, and arrangement of parts more fully hereinafter described and claimed.

My invention is illustrated in the accompanying drawings, in which—

Figure 1 is a sectional view of a portion of a bottle, showing my stopper in place therein; Fig. 2, a perspective view of the stopper; Fig. 3, a similar view of a modification thereof. Fig. 4 is a sectional view of a portion of a bottle provided with a shoulder and showing my stopper in place therein.

In the accompanying drawings, in which like letters of reference denote like parts, A is a bottle having a circumferential groove B in its neck. C designates my improved stopper inserted therein and consisting of a cup-shaped body portion having an annular spring-acting rim D, provided with cut-away portions or slits E, and a tab F, projecting from the upper edge thereof, said spring-acting rim adapted to be compressed by the walls of the neck of the bottle as the stopper is being pressed into place in the groove therein and when seated to spring out and engage said groove.

It will be seen that by having the tab extend vertically from the upper edge of the rim of the stopper when it is pulled upward to remove the stopper there will be no tendency to tear the same from the rim, as would be the case if the tab were at an angle thereto.

The stopper is preferably made of paper and stamped into shape; but it may be made of any other suitable material and shaped by any other suitable means.

To insert the stopper, take hold of the tab and force the stopper into the neck of the bottle until the spring-acting rim engages the groove therein, when it will be held securely in place. When it is desired to remove the stopper, take hold of the tab and pull it upward. This will compress the spring-acting rim and allow the stopper to be removed.

Although in Fig. 1 of the drawings I have shown my stopper applied to a bottle provided with a groove in its neck, it is equally applicable to a bottle provided with a shoulder instead of a groove, as shown in Fig. 4, and in this case the stopper is inserted by forcing it into the neck of the bottle until it seats itself on the shoulder, when the spring-acting rim will press against the walls of the neck of the bottle, and thus hold the stopper securely in place.

Having thus described my invention, what I claim is—

1. A stopper for vessels comprising a cup-shaped body portion provided with a tab projecting from an upright rim thereof, substantially as described.

2. A stopper for vessels comprising a cup-shaped body portion having an upright rim which is cut away and slitted at several points and provided with a tab projecting from the said rim substantially as described.

In testimony whereof I affix my signature in presence of two witnesses.

ALLEN STONE.

Witnesses:
 JOS. H. BLACKWOOD,
 ALBERT B. BLACKWOOD.